US007922587B2

(12) United States Patent
Chun

(10) Patent No.: US 7,922,587 B2
(45) **Date of Patent: *Apr. 12, 2011**

(54) BETTING TERMINAL AND SYSTEM

(76) Inventor: Jay Chun, Hong Kong (CN)

( * ) Notice: Subject to any disclaimer, the term of this patent is extended or adjusted under 35 U.S.C. 154(b) by 711 days.

This patent is subject to a terminal disclaimer.

(21) Appl. No.: 11/497,708

(22) Filed: Aug. 1, 2006

(65) Prior Publication Data

US 2007/0026947 A1 Feb. 1, 2007

Related U.S. Application Data

(63) Continuation-in-part of application No. 11/198,218, filed on Aug. 5, 2005, which is a continuation-in-part of application No. 11/042,732, filed on Jan. 24, 2005, which is a continuation-in-part of application No. 11/312,150, filed on Dec. 19, 2005.

(51) Int. Cl.
*A63F 13/00* (2006.01)
*A63F 9/24* (2006.01)
*A63F 1/12* (2006.01)

(52) U.S. Cl. ................ 463/42; 463/10; 463/11; 463/12; 463/13; 463/26; 463/27; 463/28; 273/149 R; 273/292

(58) Field of Classification Search .................... 463/42, 463/10–13, 26–28; 273/149 R, 292
See application file for complete search history.

(56) References Cited

U.S. PATENT DOCUMENTS 4,467,424 A * 8/1984 Hedges et al. .................. 463/26
4,659,082 A * 4/1987 Greenberg ................ 273/149 R
4,861,041 A 8/1989 Jones et al.
4,998,737 A 3/1991 Lamle
5,048,833 A * 9/1991 Lamle ............................. 463/27
5,362,064 A 11/1994 Lofink et al.
5,393,067 A 2/1995 Paulsen
5,395,119 A * 3/1995 Jacob et al. .................... 273/274
5,395,120 A * 3/1995 Malek ........................... 273/292
5,476,259 A * 12/1995 Weingardt ...................... 463/28
5,605,334 A 2/1997 McCrea
5,707,287 A 1/1998 McCrea
5,735,525 A * 4/1998 McCrea, Jr. ................. 273/309
5,762,552 A * 6/1998 Vuong et al. .................... 463/25
5,788,574 A 8/1998 Ornstein
5,836,818 A 11/1998 Jones
5,876,283 A 3/1999 Para et al.
5,957,459 A * 9/1999 Chae ............................. 273/292
6,019,374 A * 2/2000 Breeding ...................... 273/292
6,117,012 A * 9/2000 McCrea, Jr. .................... 463/27
6,217,447 B1 * 4/2001 Lofink et al. .................... 463/12
6,279,910 B1 * 8/2001 de Keller ...................... 273/292
6,293,864 B1 * 9/2001 Romero .......................... 463/12
6,361,437 B1 * 3/2002 Walker et al. ................... 463/23
6,409,602 B1 * 6/2002 Wiltshire et al. ............... 463/42
6,460,848 B1 * 10/2002 Soltys et al. ............. 273/149 R
6,508,709 B1 * 1/2003 Karmarkar ...................... 463/42
6,511,072 B1 * 1/2003 Santa Cruz et al. ........... 273/292

(Continued)

*Primary Examiner* — David L Lewis
*Assistant Examiner* — William H McCulloch
(74) *Attorney, Agent, or Firm* — Jennifer Meredith; Fariba Sirjani; Meredith & Keyhani, PLLC

(57) ABSTRACT

At least two betting terminals for playing a game, comprising a network of terminals linked to different game tables, wherein each of the terminals comprises a mechanism to switch on a plurality of games so as to allow a player at one terminal to switch to different tables and place bets at different games at a time.

17 Claims, 9 Drawing Sheets

U.S. PATENT DOCUMENTS

| | | | | |
|---|---|---|---|---|
| 6,517,436 | B2 * | 2/2003 | Soltys et al. | 463/29 |
| 6,540,230 | B1 * | 4/2003 | Walker et al. | 273/292 |
| 6,588,758 | B1 * | 7/2003 | Lee | 273/292 |
| 6,712,696 | B2 * | 3/2004 | Soltys et al. | 463/25 |
| 6,719,291 | B1 * | 4/2004 | deKeller | 273/274 |
| 6,726,564 | B2 * | 4/2004 | Hogan et al. | 463/25 |
| 6,755,741 | B1 * | 6/2004 | Rafaeli | 463/25 |
| 6,837,494 | B2 | 1/2005 | Lee | |
| 6,896,614 | B2 | 5/2005 | Romero | |
| 6,916,245 | B1 * | 7/2005 | Vancura et al. | 463/26 |
| 7,070,505 | B2 | 7/2006 | Vancura et al. | |
| 7,114,724 | B2 * | 10/2006 | Ritzer et al. | 273/292 |
| 7,189,161 | B1 * | 3/2007 | Wiltshire et al. | 463/42 |
| 7,213,812 | B2 * | 5/2007 | Schubert et al. | 273/149 R |
| 7,264,241 | B2 * | 9/2007 | Schubert et al. | 273/149 R |
| 7,303,475 | B2 * | 12/2007 | Britt et al. | 463/42 |
| 7,309,065 | B2 * | 12/2007 | Yoseloff et al. | 273/292 |
| 7,316,615 | B2 | 1/2008 | Soltys | |
| 7,325,806 | B1 * | 2/2008 | Feola | 273/292 |
| 7,367,884 | B2 * | 5/2008 | Breeding et al. | 463/25 |
| 7,451,987 | B1 | 11/2008 | Feola | |
| 2001/0000118 | A1 * | 4/2001 | Sines et al. | 273/274 |
| 2001/0029200 | A1 * | 10/2001 | Romero | 463/12 |
| 2002/0002070 | A1 * | 1/2002 | Romero | 463/11 |
| 2002/0068635 | A1 * | 6/2002 | Hill | 463/47 |
| 2002/0072407 | A1 * | 6/2002 | Soltys et al. | 463/29 |
| 2002/0111205 | A1 | 8/2002 | Beavers | |
| 2002/0115489 | A1 * | 8/2002 | Jordan et al. | 463/42 |
| 2002/0147042 | A1 * | 10/2002 | Vuong et al. | 463/40 |
| 2003/0003997 | A1 * | 1/2003 | Vuong et al. | 463/42 |
| 2003/0013510 | A1 * | 1/2003 | Vuong et al. | 463/13 |
| 2003/0069071 | A1 * | 4/2003 | Britt et al. | 463/42 |
| 2003/0151199 | A1 * | 8/2003 | Lee | 273/292 |
| 2003/0151201 | A1 * | 8/2003 | Lee | 273/292 |
| 2004/0108656 | A1 | 6/2004 | Snow | |
| 2005/0062227 | A1 * | 3/2005 | Grauzer et al. | 273/149 R |
| 2005/0073102 | A1 * | 4/2005 | Yoseloff et al. | 273/292 |
| 2005/0218597 | A1 | 10/2005 | Parsadaian | |
| 2006/0063577 | A1 | 3/2006 | Downs | |
| 2006/0071429 | A1 | 4/2006 | Okujyo et al. | |
| 2009/0061974 | A1 * | 3/2009 | Lutnick et al. | 463/13 |
| 2009/0069079 | A1 * | 3/2009 | Britt et al. | 463/25 |
| 2009/0115133 | A1 * | 5/2009 | Kelly et al. | 273/274 |

* cited by examiner

FIG. 4A
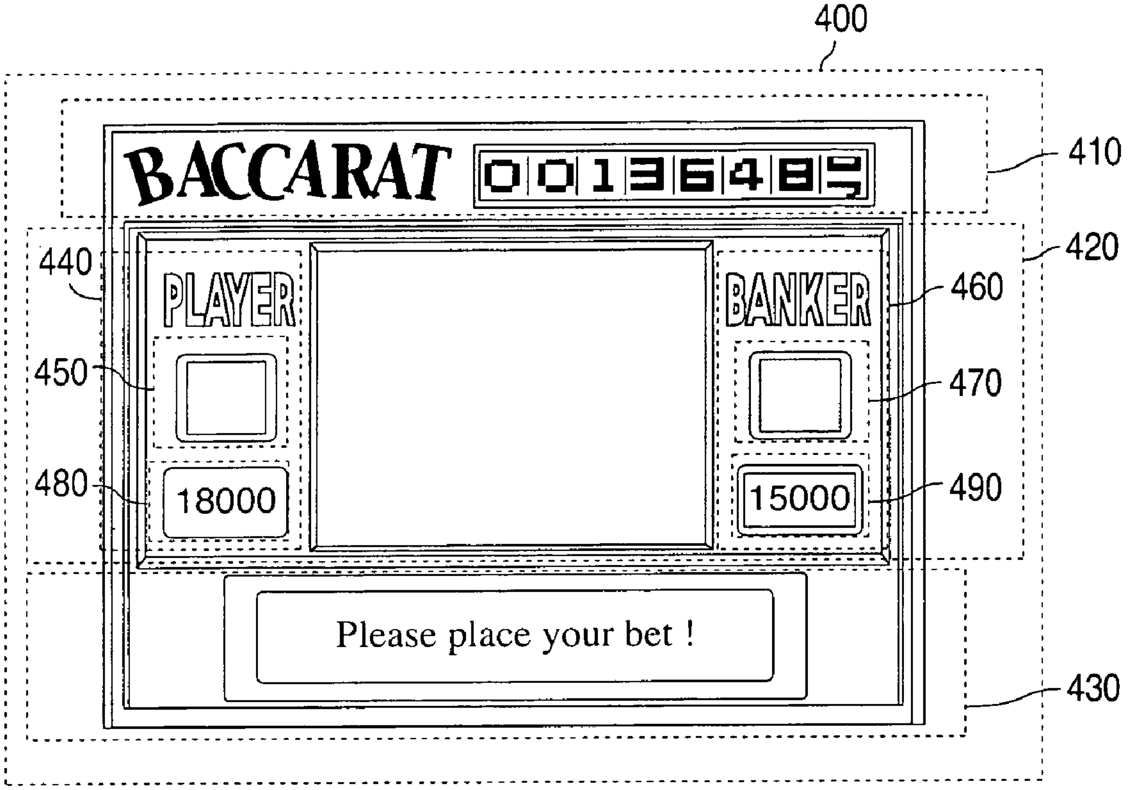
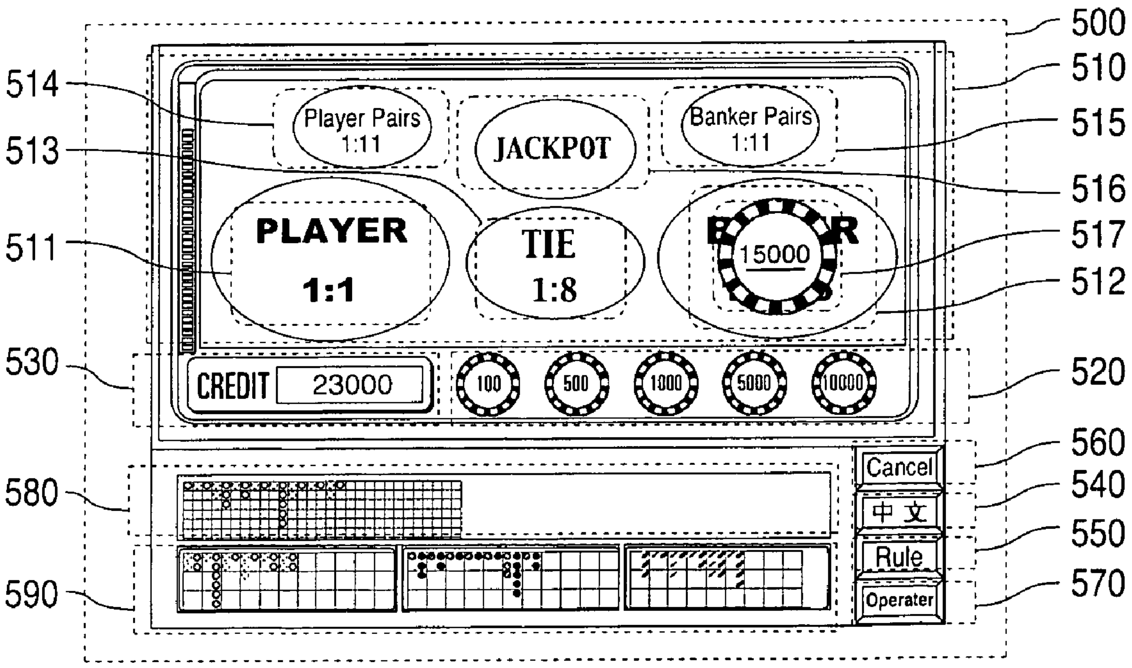
FIG. 4B

BETTING TERMINAL AND SYSTEM

CROSS-REFERENCE TO RELATED APPLICATIONS

The present application is a continuation-in-part application of U.S. application Ser. No. 11/042,732, filed Jan. 24, 2005, Ser. No. 11/198,218, filed on Aug. 5, 2005 and Ser. No. 11/312,150, filed on Dec. 19, 2005, the teachings of which are incorporated herein by reference.

BACKGROUND OF THE INVENTION

The present invention is generally directed to a betting terminal for playing a game such as a baccarat game. The invention betting terminal allows players to play different games without moving from one gaming table to another. Therefore, the invention helps to maximize the time spent by players on gaming tables while they are inside a casino and also maximize the utilization of casino floor space.

Gaming is a major form of modern entertainment. For example, baccarat is one of the more popular gambling games played in casinos or gaming establishments. As is well known, the game is played on an elongated table having a game board displayed along the upper surface of the table. The game board displays certain wagering areas, and the elongated table allows for the seating of multiple players or bettors (1-16) and the positioning of the multiple dealers (3) necessary for operating the casino game. Bettor locations are typically numbered on the table and each bettor location has an area designated for a wager on the bank hand and an area designated for a wager on the player hand. Baccarat uses a standard deck of 52 playing cards and is usually dealt from a shoe having multiple decks that have been shuffled together prior to the beginning of play.

A feature of conventional live games is that the betting process is limited to a single game. The simplicity of the betting process has led to a corresponding simplicity in the relatively few types of games which may be placed during in a casino, for example, which may limit interest on the part of the player(s) and thus further limit the casino in terms of profit and payout.

The embodiments described below address the above-described issues and needs.

SUMMARY OF THE INVENTION

Provided is a betting terminal for playing a game. The betting terminal comprises a network of terminals linked to different game tables where each of the terminals comprises a mechanism to switch on a plurality of games. A player at one terminal can switch to different tables and place bets at different games at a time. The games can be games of the same kind or games of different kind.

In some embodiments, a betting terminal can serve as a platform for placing bets in games like baccarat, roulette, sicbo ("dice game") as well as other common casino table games which are operated at tables linked to game and payout servers and betting terminals through an intranet. In some embodiments, the roulette and sicbo table games can be operated automatically or by human dealers, but the betting results shall be recorded automatically or manually and sent to game and payout servers electronically to allow automatic payout process.

The present invention also provides a software program or a set of software programs for carrying out any or all steps of the betting method described herein. The baccarat game can also be incorporated into an electronic device or an entertainment gaming machine. Representative electronic devices include, but are not limited to, laptop computers or desktop computers.

BRIEF DESCRIPTION OF DRAWINGS

FIGS. 4A, 4B, 4C and 4D show the detailed layout of a betting terminal for a baccarat machine.

DETAILED DESCRIPTION

Provided is a betting terminal for playing a game. The betting terminal comprises a network of terminals linked to different game tables where each of the terminals comprises a mechanism to switch on a plurality of games. A player at one terminal can switch to different tables and place bets at different games at a time. The games can be games of the same kind or games of different kind.

Betting Terminal

Figure 1:
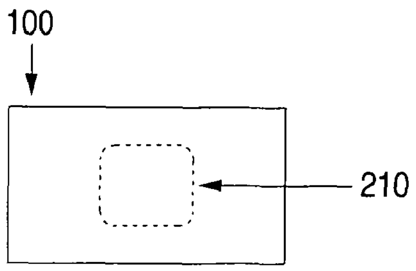
FIG. 1 shows an illustrative scheme of the betting terminal described herein.

The betting terminal can be linked to different types of games. An illustrative general scheme of the betting terminal 100 is described in FIG. 1, which includes a switching mechanism 200 (not shown) allowing a player to select a game to play. The switching mechanism 200 can further include a game indicator 210 showing the type of game selected. The switching mechanism can be located in anywhere of the betting terminal.

Figure 2:
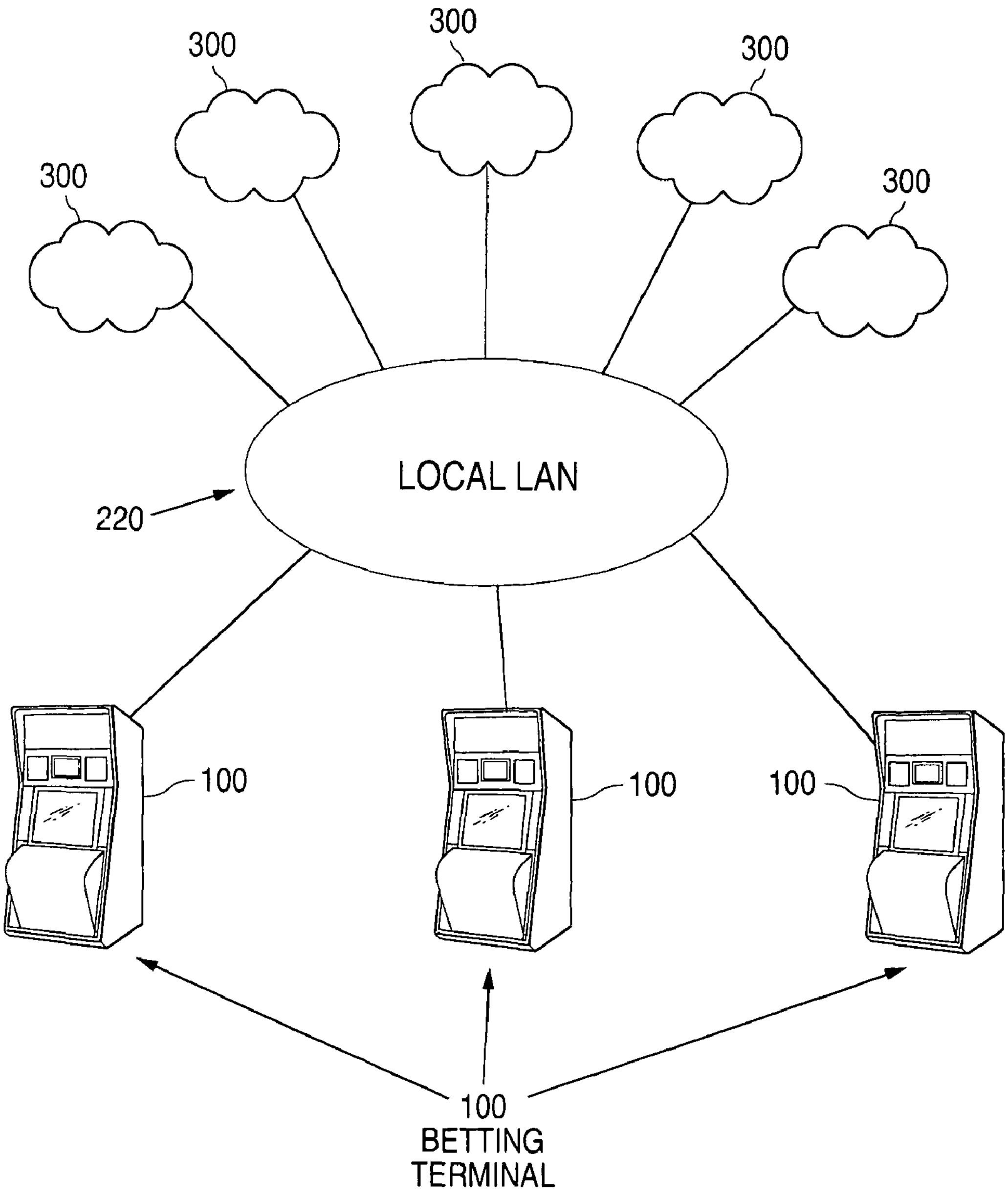
FIG. 2 shows an illustrative scheme of a betting system of the present invention.

In some embodiments, the betting terminal is linked to a plurality of game tables. An illustrative general layout of a gaming system via a betting terminal of the present invention is provided by FIG. 2. In FIG. 2, a plurality of betting terminal (100) (three betting terminals are listed as examples) are linked via a network (220) to a plurality of game tables (300). The game tables can be conventional baccarat game tables, jackpot baccarat game tables as described in the U.S. application Ser. No. 11/042,732, filed on Jan. 24, 2005, Ser. No. 11/198,218, filed on Aug. 5, 2005 and Ser. No. 11/312,150, filed on Dec. 19, 2005, and Macau Patent Application Nos. 1/150, filed on Feb. 4, 2005 and 1/265, filed on Jan. 24, 2006, the teachings of which are incorporated herein by reference. In some embodiments, the game tables can be any game tables played in a casino or internet.

In one embodiment, the betting terminal described herein is one for baccarat. For example, a baccarat gaming system that allows one to play a live baccarat jackpot as described in the U.S. application Ser. Nos. 11/042,732, filed on Jan. 24, 2005, Ser. No. 11/198,218, filed on Aug. 5, 2005 and Ser. No. 11/312,150, filed on Dec. 19, 2005, and Macau Patent Application Nos. 1/150, filed on Feb. 4, 2005 and 1/265, filed on Jan. 24, 2006, the teachings of which are incorporated herein by reference.

Figure 3:
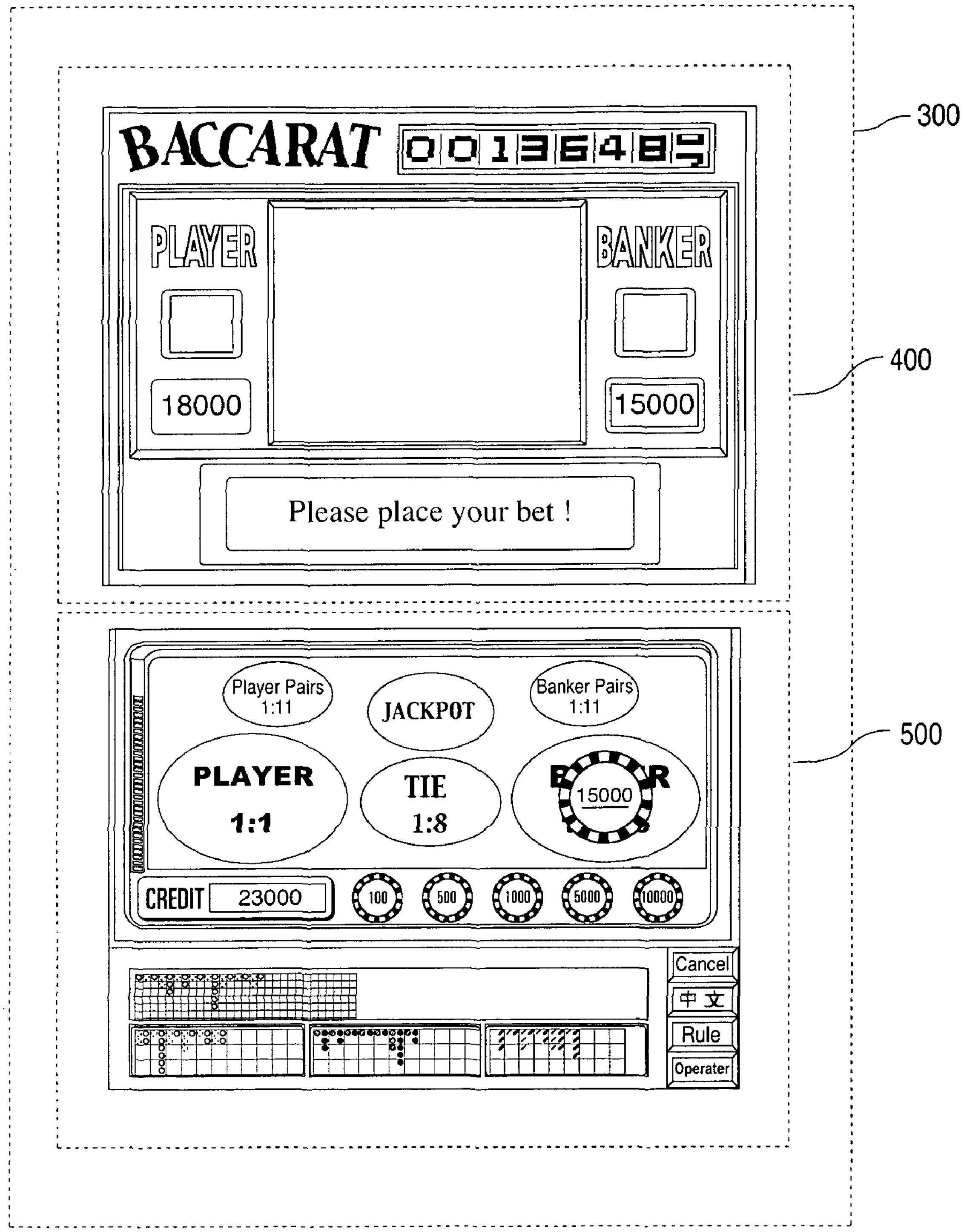
FIG. 3 shows a general layout of a betting terminal for live jackpot baccarat game.

A general layout of a betting terminal for a live jackpot baccarat game is shown in FIG. 3, FIGS. 4A and 4B. FIG. 3 shows the overall layout of the betting terminal (100), which has two screens, the upper screen (400) and the lower screen (500), shown in detail in FIGS. 4A and 4B, and a switching mechanism 200, which is not shown. Referring to FIG. 4A, upper screen 400 includes an display part (410) for displaying the rolling amount of jackpot, the center part (420) for displaying a live video of the gambling table, and a messenger screen (430) for displaying messages or game cards. The center part of the upper screen has a left section designated as Player (440), which has a small screen (450), and right section designated as Banker (460), which also has a small screen (470). The small screens 450 and 470 are for display of card values of the player hand and the bank hand respectively. The current limits available for betting on Player (player hand) and Banker (bank hand) in a live baccarat game are shown in small screens 480 and 490 below small screens 450 and 470, respectively.

Referring to FIG. 4B, the lower screen 500 is an operating touch screen for betting, which includes bet-option buttons (510), bet-amount buttons (520), and credit window (530). The bet-option buttons 510 include the various betting selections described above, e.g., betting for player hand (511) win with a payoff rate of 1:1, for the bank hand (512) win with a payoff rate of 1:0.95, for tie (513) with a payoff rate of 1:8, for Player Pairs (514) with a payoff rate of 1:11, for banker pairs (515) with a payoff rate of 1:11, and for Jackpot bet (516), the rules of which are described above. Box 517 shows the pops up when bets are placed on a particular bet option. The number inside Box 517 corresponds to the amount placed on a particular bet option. The bet-amount buttons 520 as shown in the layout, 100, 500, 1000, 5000, 10000, provide the players the convenience of adding up betting amounts in a fast manner. To illustrate, for a bet of 10,000 USD or HKD, the player can simply press the "1000" button ten times to reach the desired betting amount. Note, the bet-amount buttons 520 shown are illustrative and non-exclusive. Buttons designated for other amounts, e.g., "1", "5", "10", "100", "100,000", "1,000,000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance.

Still referring to FIG. 4B, the lower screen 500 further includes language selection button (540), which can switch the operation language of the baccarat game between, e.g., Chinese, English, Portuguese, Italian, French, Spanish, Russian, German, Arabic, Japanese, and Korean, etc, Rule selection button (550), which prompts the display of rules for live baccarat and Paradise Jackpot™, Cancel button (560), which allows the bettor to cancel all bets made before he presses the confirmation button on the top right hand corner of the lower screen. Operator button (570), which allows the bettor to call for assistance from the casino staff when there is machine failure or the bettor wishes to exit from the game, and Results Bars (580, 590) which display the results for previous live baccarat games. Once results of a game are confirmed, the losing bet shown in the bet option buttons (510) in the center of lower screen will disappear while the winning bet in the bet option buttons (510) in the lower screen will flash and a diagram will pop up with detailed breakdown of the payouts for each of the bet options won.

Figure 4C:
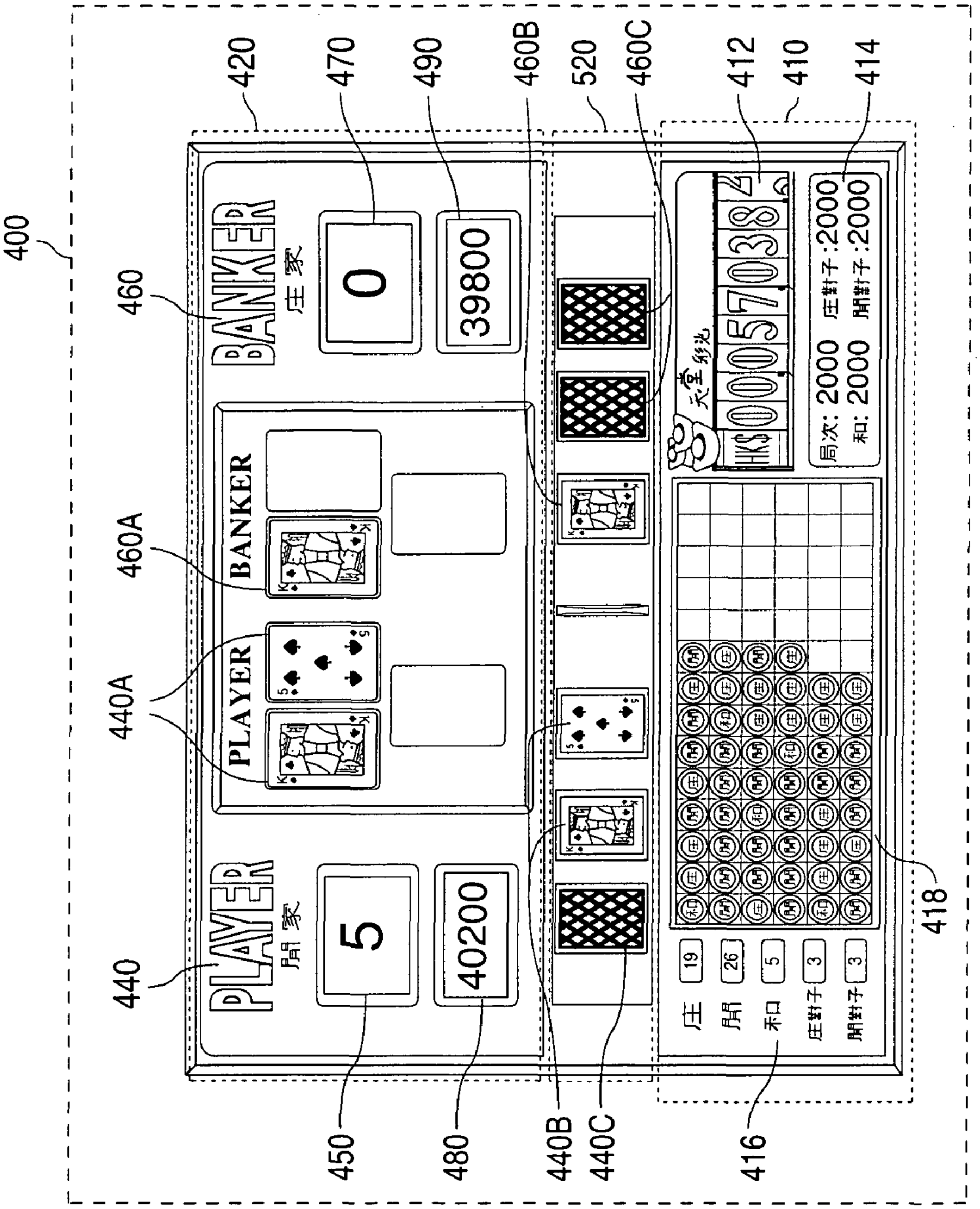
Figure 4D:
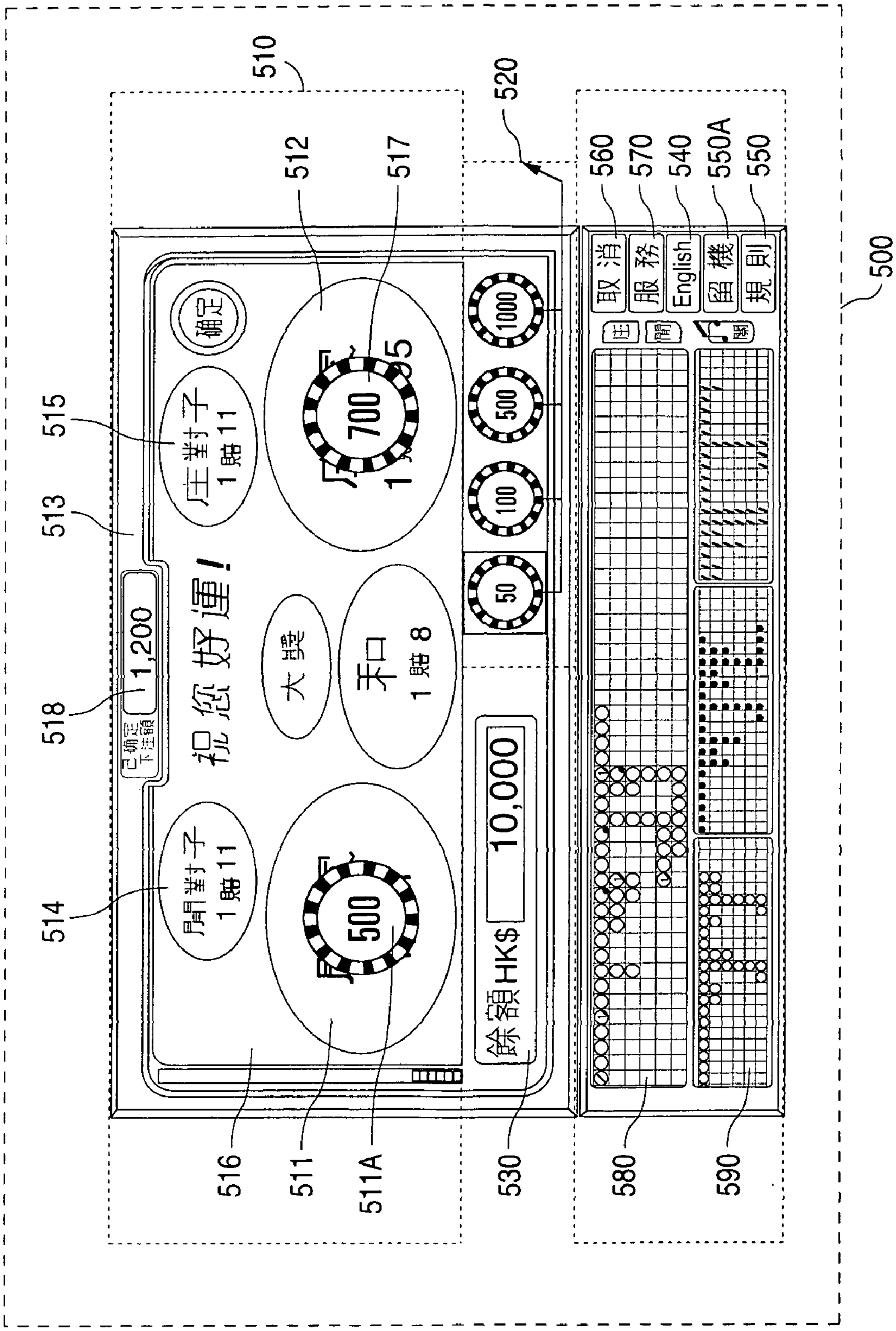

FIGS. 4C and 4D show two variants of the design of the betting terminal similar to the embodiment as described in FIGS. 4A-4B. Referring to FIG. 4C, upper screen 400 includes a display part (410) for displaying the baccarat game result and rolling amount of jackpot, a display part (420) for displaying a live video of the gambling table, and a messenger screen (430) for displaying game cards. The display part 420 has a left section designated as Player (440), which has a small screen (450), and right section designated as Banker (460), which also has a small screen (470). The small screens 450 and 470 are for display of card values of the player hand and the bank hand respectively. The current limits available for betting on Player (player hand) and Banker (bank hand) in a live baccarat game are shown in small screens 480 and 490 below small screens 450 and 470, respectively.

Still referring to FIG. 4C, the display part 420 can display Player game cards 440A and Banker game cards 460A. The messenger screen 430 shows game cards directly from a shoe in a baccarat game (not shown), 440B and 440C for the Player, and 460B and 460C for the Banker. The game cards 440A and 440B correlate to each other can have the same or different appearance. Similarly, the game cards 460A and 460B correlate to each other can have the same or different appearance. Preferably, game cards 440A, 440B, 440C, 460A, 460B and 460C are shown directly from a shoe in a baccarat game (not shown).

Still referring to FIG. 4C, the display part 410 includes a screen (412) for showing jackpot amount, display 414 showing game number (e.g., game No. 52) and respective amounts available for betting on banker pairs, player pairs or tie, display 416 showing the frequency of bank hand win, player hand win and tie in past games, and display 418 showing the sequence of bank hand win, player hand and tie in past games.

Referring to FIG. 4D, the lower screen 500 is an operating touch screen for betting, which includes bet-option buttons (510), bet-amount buttons (520), and credit window (530). The bet-option buttons 510 include the various betting selections described above, e.g., betting for player hand (511) win with a payoff rate of 1:1, for the bank hand (512) win with a payoff rate of 1:0.95, for tie (513) with a payoff rate of 1:8, for Player Pairs (514) with a payoff rate of 1:11, for banker pairs (515) with a payoff rate of 1:11, and for Jackpot bet (516), the rules of which are described above. Box (511A) and Box (517) show the pops up when bets are placed on a particular bet option. The number inside Box 511A corresponds to the amount placed on a particular bet option on a player hand win. The number inside Box 517 corresponds to the amount placed on a particular bet option on banker hand win. Display screen (518) shows the total accepted amount of bets placed on all bet options. The bet-amount buttons 520 as shown in the layout, 50, 100, 500, 1000, provide the players the convenience of adding up betting amounts in a fast manner. Note, the bet-amount buttons 520 shown are illustrative and non-exclusive. Buttons designated for other amounts, e.g., "1", "5", "10", "100", "100,000", "1,000,000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance.

Still referring to FIG. 4D, the lower screen 500 further includes language selection button (540), which currently is in Chinese and can switch the operation language of the betting table between, e.g., Chinese, English, Portuguese, Italian, French, Spanish, Russian, German, Arabic, Japanese, and Korean, etc, Rule selection button (550), which prompts the display of rules for a selected game (e.g., a live baccarat and Paradise Jackpot™), Stand-by button 550A to lock the betting terminal if the better wishes to leave the terminal for a short period of time, Cancel button (560), which allows the bettor to cancel all bets made before he presses the confirmation button on the top right hand corner of the lower screen. Operator button (570), which allows the bettor to call for assistance from the casino staff when there is machine failure or the bettor wishes to exit from the game, and Results Bars (580, 590) which display the results for previous live baccarat games. Once results of a game are confirmed, the losing bet shown in the bet option buttons (510) in the center of lower screen will disappear while the winning bet in the bet option buttons (510) in the lower screen will flash and a diagram will pop up with detailed breakdown of the payouts for each of the bet options won.

Figure 4E:
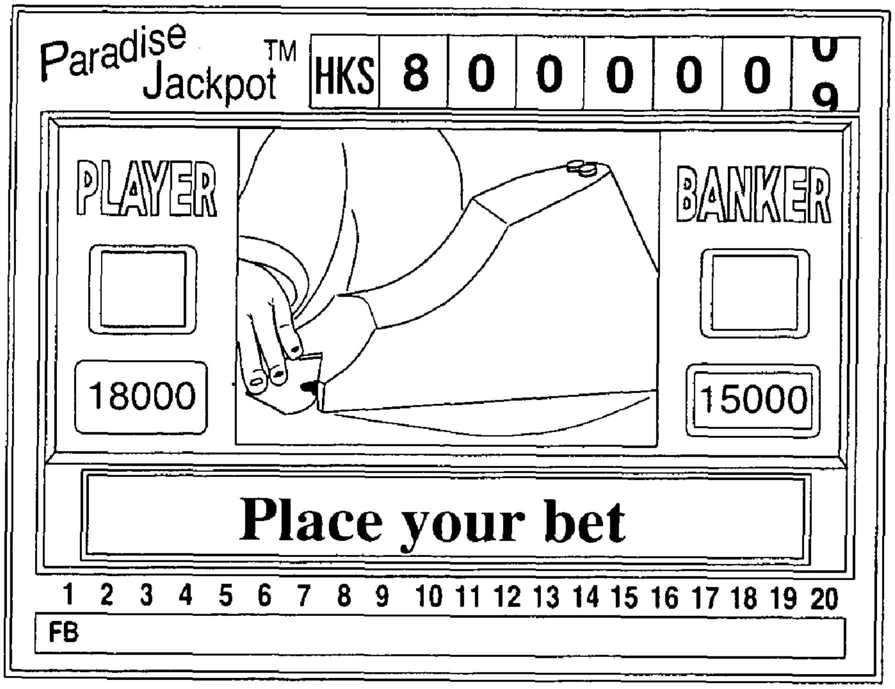
FIGS. 4E, 4F, 4G, and 4H show variants of the layout of the betting terminal shown in FIGS. 4A-4D.
Figure 4F:
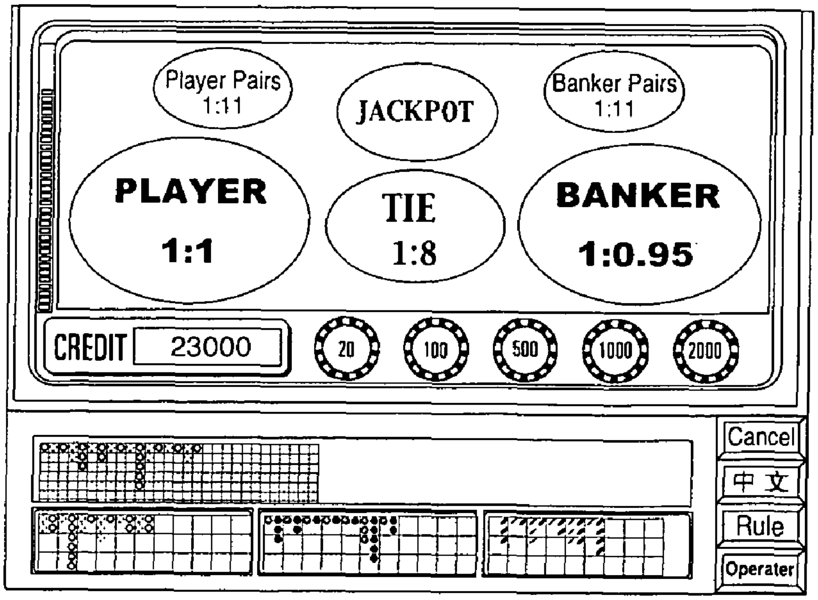
Figure 4G:
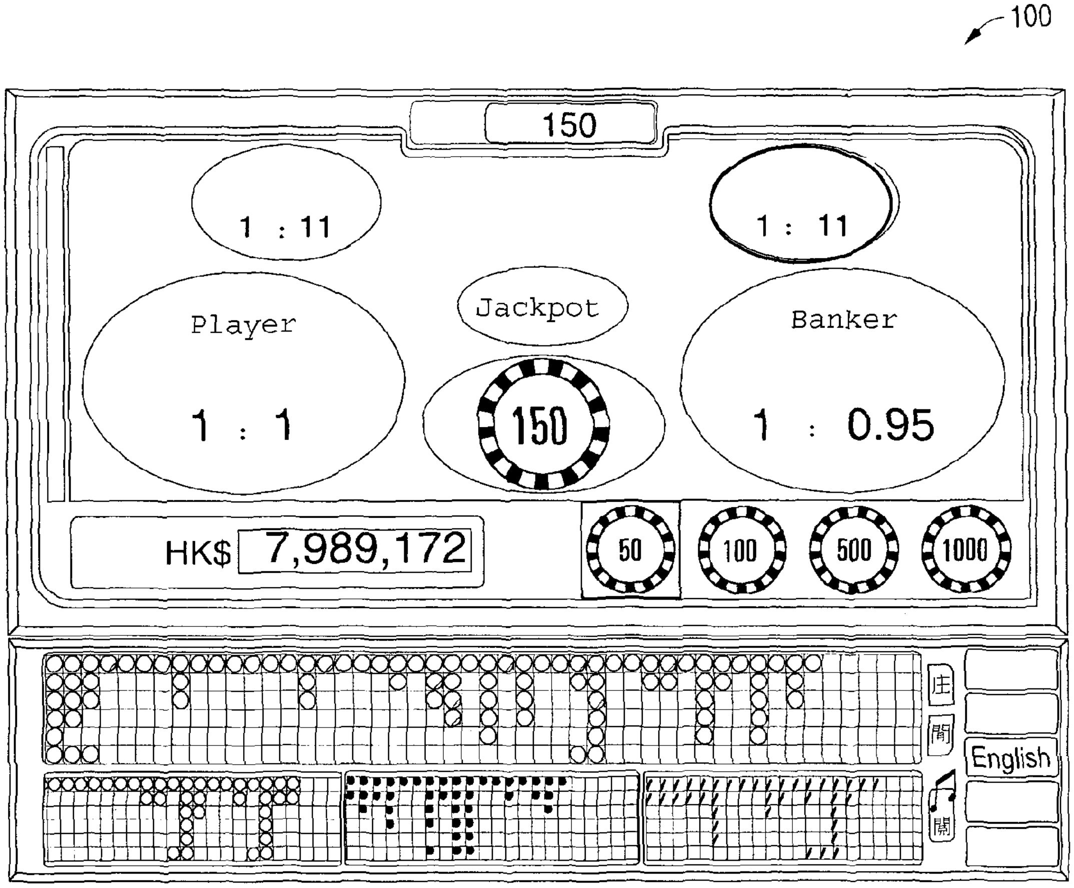
Figure 4H:
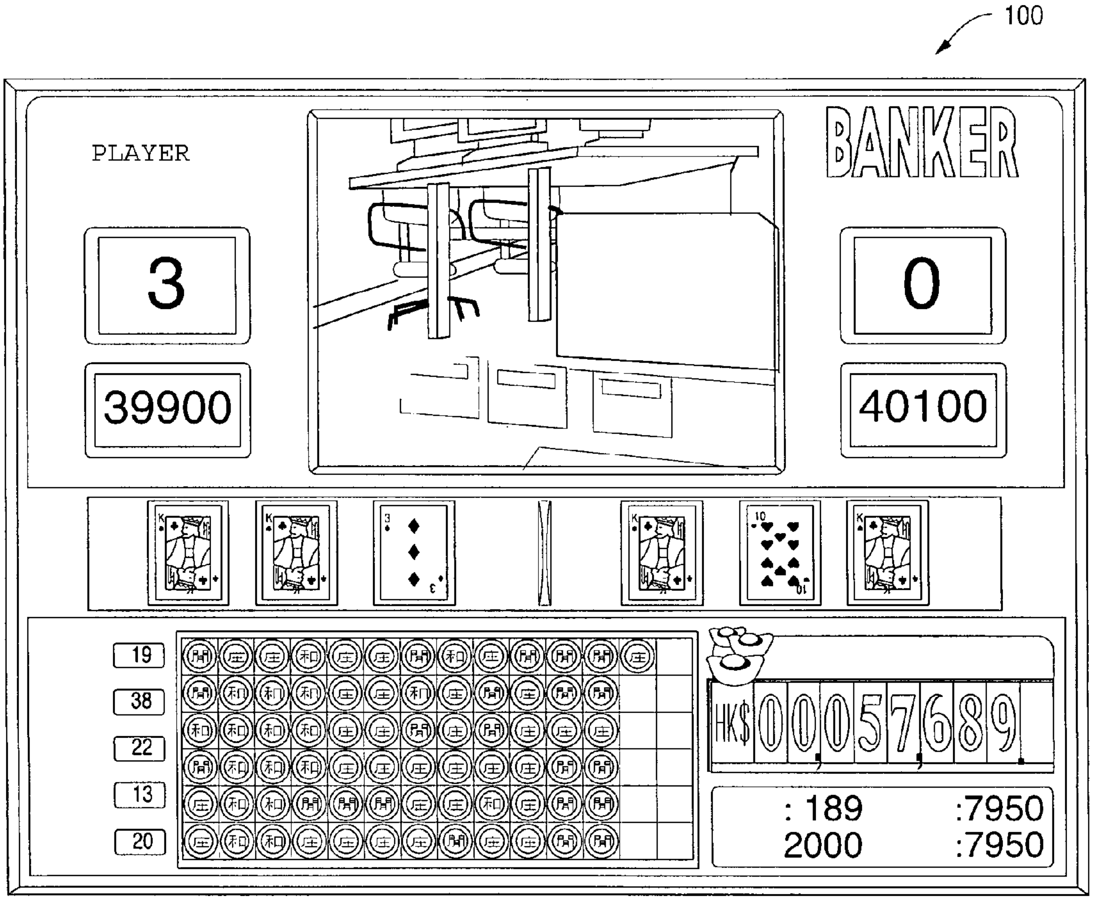

FIGS. 4F and 4H are alternative designs of the upper screen 400 as shown in FIG. 4A, which has a similar layout as the one shown in FIG. 4A except that the top left corner of the upper screen displays the words "Paradise Jackpot™", and the bottom rim has a blank bar and numbers 1 through 20 for showing the result of past games on top of the bar.

FIGS. 4E and 4G are alternative designs of the lower screen of 500 as shown in FIG. 4B, which as a similar layout as the one shown in FIG. 4B except that the top rim of the lower screen 500 bears letters indicating the left side as the Player side and the right side and the Banker side, a screen at the far up-left corner indicating the maximum bet on the player hand accepted by the dealing table in a game, and a screen at the far up-right corner indicating the maximum bet on the banker hand accepted by the dealing table in a game.

Figure 5B:
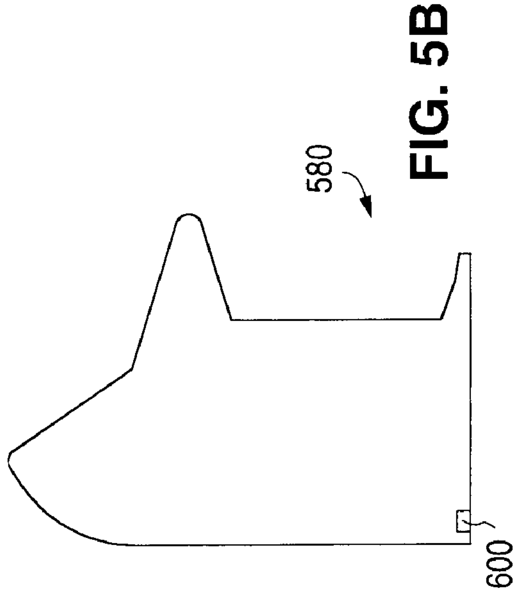
FIGS. 5A, 5B, 5C, 5D, and 5E show embodiments of the overall design of the betting terminal.
Figure 5A:
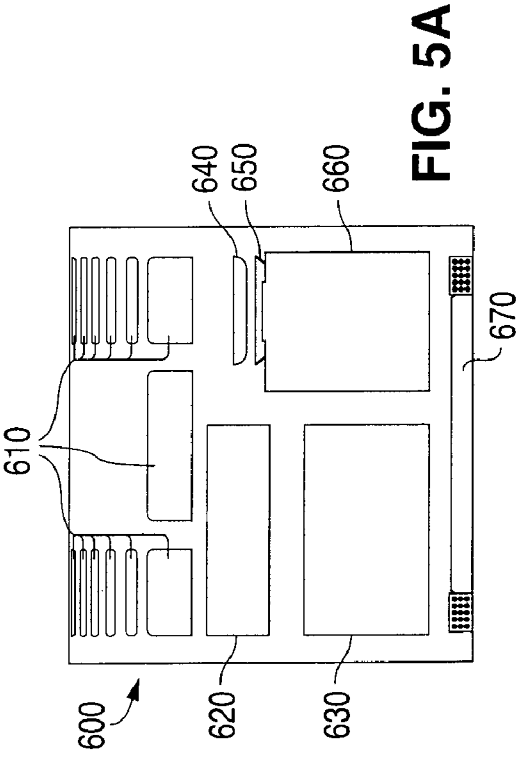
Figure 5E:
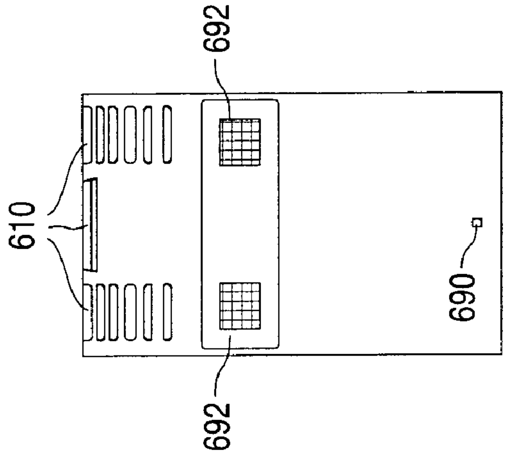
Figure 5D:
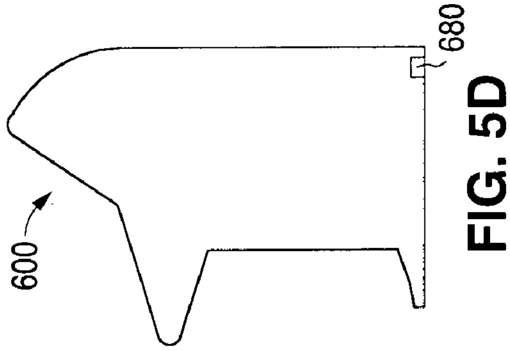
Figure 5C:
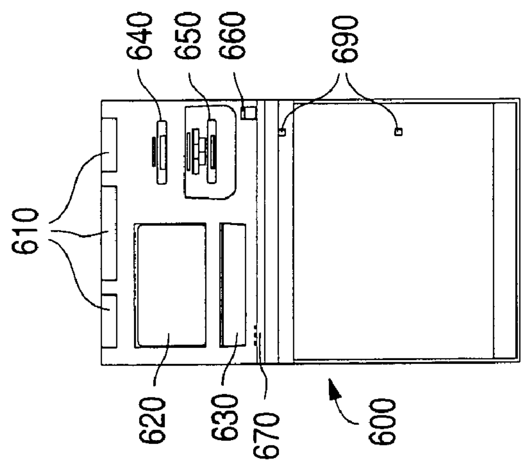

FIG. 5A shows an embodiment of the top layout betting terminal of the present invention. The top layout includes information Lamp 610, which can be color-changeable LED and flashes when a player wins a betting option, an upper screen 620, bottom screen 630, a ticket printer slot 640, a bill slot 650, table 660 for holding beverage drinks or ashtray, and speaker 670. In some embodiments, the ticket printer can print out ticket with bar code. In some embodiments, a player can also insert ticket with bar code to increase the credit amount that a play may have in a betting game. FIGS. 5B and 5D show two side views of the betting terminal, showing a cable path. FIG. 5C shows a front view of the betting terminal, showing the top layout described in FIG. 5A and speaker 670. FIG. 5E shows a back view of the betting terminal of this embodiment, showing Lamp 610, lock mechanism 690 and fan 692. In an embodiment, tree betting terminals can be clustered in a unit.

In some embodiments, the betting system can automatically generate commonly accepted format of past results of played games on the screen to provide references for players.

The betting terminal described above can be embodied in any form. In some embodiments, the betting terminal can be a device. In some embodiments, the betting terminal can be a virtual terminal. One of ordinary skill in the art can readily construct the betting terminal described herein.

Gaming System

The betting terminal described above can be used in any gaming system. In some embodiments, a betting terminal can serve as a platform for placing bets in games like baccarat, roulette, sicbo ("dice game") as well as other common casino table games which are operated at tables linked to game and payout servers and betting terminals through an intranet. In some embodiments, the roulette and sicbo table games can be operated automatically or by human dealers, but the betting results shall be sent to game and payout servers electronically to allow automatic payout process.

In some embodiments, the gaming system can further include a device on each dealing table to record the betting results automatically or manually and send the results to server for computation of payouts. In some embodiments, such a device can be, for examples, electronic scanning or reading devices known in the art, card dealing shoe with scanning device to read the cards, electronic detecting device to identify ball location on a roulette and image recognition device for reading results of a dice game.

In some embodiments, the gaming system is a baccarat gaming system. The gaming system can include a dealing table comprising a touch screen. The dealing table allows a dealer to perform a dealing process. The touch screen can prompt the dealer of the dealing process. In some embodiments, the touch screen can provide dealing instructions.

The games that can be played via the betting terminal described herein in game tables or terminals located within a single gaming establishment or throughout multiple gaming establishments. The game tables or terminals can be linked together by wire or wireless linking or connecting mechanisms. In some embodiments such linking mechanisms can be electric and/or optical cable. In some embodiments, the linking mechanism can be internet or intranet.

In some embodiments, the present invention also provides a software program or a set of software programs for carrying out any or all steps of the betting method described herein. The baccarat game can also be incorporated into an electronic device or an entertainment gaming machine. Representative electronic devices include, but are not limited to, laptop computers or desktop computers. In some embodiments, such electronic devices can be a cell phone, a blackberry device or a hand held device such as hand held personal computer (PC) or personal data assistants (PDAs).

The betting table and system described above can be readily constructed by an artisan of ordinary skill.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A system in a casino for playing an in-casino game, the system comprising:

- a network of betting terminals linked to a plurality of game tables, first players playing a first game at each of the game tables, the first players including a dealer, the first game being a live baccarat game,
- wherein, at the game tables, the first game includes dealing cards to a player hand and a bank hand according to a set of conventional baccarat rules including dealing a third card according to the set of conventional baccarat rules,
- wherein each of the betting terminals comprises a mechanism to display a plurality of first games occurring at the game tables in the casino so as to allow a second player at each one of the betting terminals to switch to different game tables and place bets at different ones of the first games at a same time,
- wherein the mechanism allows the second player to select from betting options consisting of betting options provided by a live game being played by the first players at the game tables,
- wherein the betting options of the second player consist of betting for a first player hand, betting for a bank hand, betting for a tie, betting for a player pair, betting for a banker pair, and placing a separate jackpot wager bet on a jackpot game based on the first games being played live at the game tables, wherein the system includes a display part having a screen for showing game number and respective amounts available for betting on the banker pair, the player pair or the tie, and the separate jackpot game, the display part further showing a frequency of bank hand wins, player hand wins and ties in past games, and a sequence of the bank hand wins, the player hand wins and the ties in past games, and wherein an outcome of the separate jackpot game is determined according to a combination of cards that comprises at least one zero-point card and according to only the first five cards drawn and the suit of the first five cards drawn in the first game.

2. The system of claim 1, wherein the network comprises a monitoring device for monitoring a live game on each of the game tables, and wherein the betting terminal further comprises a screen for showing the live game.

3. The system of claim 2, wherein the monitoring device is a video camera.

4. The system of claim 3, wherein said betting terminals are an electronic device or entertainment gaming machine.

5. The system of claim 4, wherein the electronic device is a laptop or desktop computer, a cell phone, a hand held personal computer (PC) or a hand held personal data assistant (PDA).

6. The system of claim 2, wherein the screen is a textual screen, a video screen or a combination of these.

7. The system of claim 6, wherein said betting terminals are an electronic device or entertainment gaming machine.

8. The system of claim 7, wherein the electronic device is a laptop or desktop computer, a cell phone, a hand held personal computer (PC) or a hand held personal data assistant (PDA).

9. The system of claim 2, said wherein said betting terminals are an electronic device or entertainment gaming machine.

10. The system of claim 9, wherein the electronic device is a laptop or desktop computer, a cell phone, a hand held personal computer (PC) or a hand held personal data assistant (PDA).

11. The system of claim 1, wherein the betting terminals are linked to a gaming system comprising a game server or a payout server.

12. The system of claim 11, wherein said betting terminals are an electronic device or entertainment gaming machine.

13. The system of claim 12, wherein the electronic device is a laptop or desktop computer, a cell phone, a hand held personal computer (PC) or a hand held personal data assistant (PDA).

14. The system of claim 1, further comprising:

a server coupled to the plurality of game tables and to the betting terminals; and a device on each game table to record the betting results automatically or manually and send the results to said server for computation of payouts, wherein the game tables are dealing tables where dealing by a dealer takes place.

15. The system of claim 1, wherein one or more of the game tables is a dealing table that comprises a touch screen, wherein the dealing table allows a dealer to perform a dealing process, and wherein the touch screen is capable of prompting the dealing of the dealing process or providing dealing instructions.

16. The system of claim 1, wherein said betting terminals are an electronic device or entertainment gaming machine.

17. The system of claim 16, wherein the electronic device is a laptop or desktop computer, a cell phone, a hand held personal computer (PC) or a hand held personal data assistant (PDA).

* * * * *